United States Patent
Muenzel et al.

[11] Patent Number: 6,055,858
[45] Date of Patent: May 2, 2000

[54] ACCELERATION SENSOR

[75] Inventors: Horst Muenzel; Dietrich Schubert, both of Reutlingen; Alexandra Boehringer, Leonberg; Michael Offenberg, Tuebingen; Klaus Heyers; Markus Lutz, both of Reutlingen, all of Germany

[73] Assignee: Robert Bosch GmbH, Stuttgart, Germany

[21] Appl. No.: 09/362,936

[22] Filed: Jul. 28, 1999

Related U.S. Application Data

[62] Division of application No. 08/933,446, Sep. 18, 1997, Pat. No. 5,959,208, which is a division of application No. 08/599,838, Feb. 12, 1996, Pat. No. 5,723,353.

[30]    Foreign Application Priority Data

Feb. 10, 1995  [DE]  Germany .......................... 1 95 04 151
Aug. 22, 1995  [DE]  Germany .......................... 1 95 30 736

[51] Int. Cl.[7] ....................................................... G01P 3/00
[52] U.S. Cl. ....................................................... 73/504.12
[58] Field of Search ........................................... 73/504.12

[56]           References Cited

U.S. PATENT DOCUMENTS

| | | |
|---|---|---|
| 5,395,802 | 3/1995 | Kiyota . |
| 5,447,067 | 9/1995 | Biebl et al. . |
| 5,495,761 | 3/1996 | Diem et al. . |
| 5,510,276 | 4/1996 | Diem et al. . |
| 5,563,343 | 10/1996 | Shaw et al. . |
| 5,576,250 | 11/1996 | Diem et al. . |
| 5,618,989 | 4/1997 | Marek . |
| 5,627,317 | 5/1997 | Offenberg et al. . |
| 5,631,422 | 5/1997 | Sulzberger et al. . |
| 5,635,638 | 6/1997 | Geen . |
| 5,646,347 | 7/1997 | Weiblen et al. . |
| 5,747,690 | 5/1996 | Park et al. . |

FOREIGN PATENT DOCUMENTS

| | | |
|---|---|---|
| 0 539 393 | 5/1993 | European Pat. Off. . |
| 43 18 466 | 12/1994 | Germany . |
| 44 19 844 | 12/1995 | Germany . |

*Primary Examiner*—Richard A. Moller
*Attorney, Agent, or Firm*—Kenyon & Kenyon

[57]            ABSTRACT

An acceleration sensor is composed of a three-layer system. The acceleration sensor and conductor tracks are patterned out of the third layer. The conductor tracks are electrically isolated from other regions of the third layer by recesses and electrically insulated from a first layer by a second electrically insulating layer. In this manner, a simple electrical contacting is achieved, which is configured out of a three-layer system. One exemplary application of the acceleration sensor includes mounting the acceleration sensor on a vibrational system of an rpm (rate-of-rotation sensor). This simplifies the manufacturing of an rpm sensor, since the vibrational system and the acceleration sensor are configured out of a three-layer system, wherein the conductor tracks are run into the frame of the rpm sensor in which the vibrational system is suspended, so as to allow excursion.

3 Claims, 7 Drawing Sheets

ACCELERATION SENSOR

This application is a division of prior application Ser. No. 08/933,446, now U.S. Pat. No. 5,959,208 filed Sep. 18, 1997, which is a division of Ser. No. 08/599,838 filed Feb. 12, 1996 now U.S. Pat. No. 5,723,353.

FIELD OF THE INVENTION

The present invention relates to an acceleration sensor.

BACKGROUND OF THE INVENTION

Non-published German Patent Application No. 44 19 844 describes an acceleration sensor that is composed of three layers. The first layer serves as a support plate (substrate board) on which a second, insulating layer is applied. Applied to the second insulating layer is a third layer, out of which the movable element of the acceleration sensor is configured. Electrical leads are arranged on the top side of the third layer. The movable part is isolated from other regions of the third layer by dielectric isolation trenches. The acceleration sensor is patterned (configured) out of silicon.

SUMMARY OF THE INVENTION

In comparison, the advantage of the acceleration sensor according to the present invention is that the acceleration sensor and the electrical leads are fabricated on the basis of a three-layer system.

The result is an especially simple manufacturing process and an acceleration sensor that is able to be produced cost-effectively. Only two masking steps are needed in a minimal process to fabricate the acceleration sensor. The process according to the present invention has the advantage that an acceleration sensor is able to be produced using few masks and, thus, few processing steps. The process is simple and cost-effective.

It is especially advantageous to configure the acceleration sensor out of a silicon-on-insulator layer system. Thus, one utilizes the advantages of the silicon-on-insulator (SOI) layer system to manufacture the acceleration sensor.

Another advantageous development of the acceleration sensors according to the present invention includes using a comb-type structure as a movable element that is deflectable parallel to the surface of the third layer. This enables a force to be detected that acts parallel to the surface of the third layer. Yet another advantageous development of the acceleration sensor according to the present invention includes using a comb-type structure that has a movable element with first plates and two stationary elements with second plates. The first and second plates are so arranged that when the movable element is deflected, some of the first plates move away from the second plates, and some of the first plates move closer to the second plates. The first and second plates form capacitors and, when the movable element is deflected, the distance between the plates change and, thus, so does the capacitance of the capacitors. In this manner, two different measuring signals are produced and are evaluated, making it possible to calculate the deflection of the movable element and, thus, the acting force or acceleration with greater accuracy.

The conductivity of the conductor tracks is advantageously improved in that conductive layers in the form of bonding pads and leads are applied to the conductor tracks.

One exemplary application of the acceleration sensor includes mounting the acceleration sensor on a vibrational system of an rpm sensor (rate-of-rotation sensor). This simplifies the manufacturing of the rpm sensor, since the vibrational system and the acceleration sensor are configured out of a three-layer system. Another advantageous further development of the acceleration sensor of the present invention, which is mounted on the rpm sensor, includes running the conductor tracks into the frame of the rpm sensor, in which the vibrational system is suspended so as to allow excursion.

An advantageous further development of the process according to the present invention includes that the conductor tracks or the conductor tracks and the suspension mounts are first patterned, and the movable element of the acceleration sensor, in particular a comb-type structure, is subsequently configured out of the third layer. This eliminates the need for applying a coating layer to the comb-type structure that would only be able to be removed with difficulty later.

An improvement of the process according to the present invention includes applying a passivation layer to the first layer. In addition, it is advantageous to remove the passivation layer in the area of the vibrational system and to etch the first layer down to a specified thickness.

BRIEF DESCRIPTION OF THE DRAWINGS

FIG. 3.1 shows a three-layer system manufactured by a first process according to the present invention.

FIG. 3.2 shows the three-layer system of FIG. 3.1 after further processing according to the present invention.

FIG. 3.3 shows the three-layer system of FIG. 3.1 after further processing according to the present invention.

FIG. 3.4 shows the three-layer system of FIG. 3.1 after further processing according to the present invention.

FIG. 3.5 shows a cross-sectional view along the line A—A shown in FIG. 2.

FIG. 3.6 shows a variant for manufacturing an acceleration sensor according to the present invention.

FIG. 4.1 shows a three-layer system manufactured by a second process according to the present invention.

FIG. 4.2 shows the three-layer system of FIG. 4.1 after further processing according to the present invention.

FIG. 4.3 shows the three-layer system of FIG. 4.1 after further processing according to the present invention.

FIG. 4.4 shows the three-layer system of FIG. 4.1 after further processing according to the present invention.

FIG. 4.5 shows the three-layer system of FIG. 4.1 after further processing according to the present invention.

FIG. 4.6 shows the three-layer system of FIG. 4.1 after further processing according to the present invention.

FIG. 4.7 shows the three-layer system of FIG. 4.1 after further processing according to the present invention.

FIG. 5.1 shows the first step in a process for manufacturing a rpm sensor according to the present invention.

FIG. 5.2 shows a further processing step for the manufacture of a rpm sensor shown in FIG. 5.1.

FIG. 5.3 shows a further processing step for the manufacture of a rpm sensor shown in FIG. 5.1.

FIG. 5.4 shows a further processing step for the manufacture of sensor shown in FIG. 5.1.

FIG. 6.1 shows a further processing step for the manufacture of a rpm sensor shown in FIG. 5.2.

FIG. 6.2 shows an intermediate step of the etching process shown in FIG. 6.1.

DETAILED DESCRIPTION OF THE INVENTION

Figure 1:
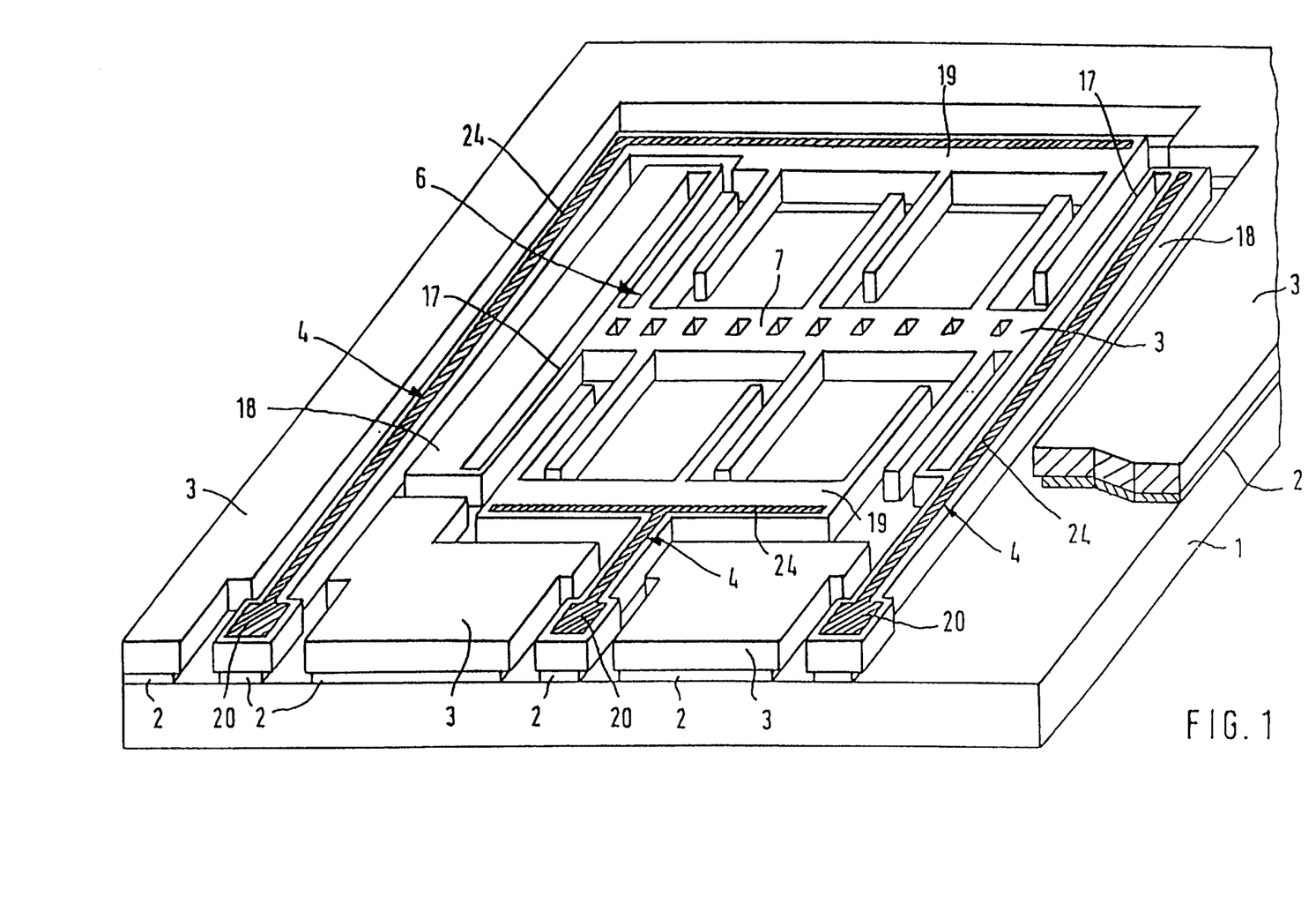
FIG. 1 illustrates an acceleration sensor according to the present invention.

FIG. 1 depicts an acceleration sensor 6 according to the present invention constructed from a three-layer system. In this exemplary embodiment, a silicon-on-insulator (SOI) layer system is used. However, other three-layer systems are also conceivable, where the top-most layer must be patternable, and the middle layer must be patternable, be able to be etched laterally, and be insulating.

A first layer 1 made of silicon is used as a support plate. A second layer 2 made of silicon oxide is applied to the first layer 1. A third layer 3 likewise includes silicon. Patterned out of the third layer 3 in the middle is a deflectable mass 7, which includes an elongated frame element with three plates on each longitudinal side. The plates are arranged in a direction normal to the longitudinal direction of the frame element. The deflectable mass 7 is connected with excursion (deflection) capability at each end, in each case via a flexural web 17 to a mounting support 18 in the longitudinal direction of the frame element. The mounting supports 18 are securely connected via the second layer 2 to the first layer 1. The second layer 2 is removed from below. the deflectable mass 7 and the flexural webs 17. When working with SiO$_2$, this is done by, for example, using etching methods. This embodiment of the deflectable mass corresponds to that of the German Patent No. 44 19 844.

Patterned out of the third layer 3, parallel to the frame element of the deflectable mass 7, is an elongated retention bar 19, which has three plates aligned in a direction normal to the frame element of the deflectable mass 7. The retention bars 19 are securely connected via the second layer 2 to the first layer 1. The plates of a retention bar 19 are arranged in each case on the right side of the plates of the deflectable mass 7. The plates of the other retention bar 19 are arranged in each case on the left side of the plates of the deflectable mass 7.

Now, if the deflectable mass 7 is deflected, then the distances between the plates arranged on one side of the deflectable mass 7 and the plates of a retention bar become smaller and, at the same time, the distances between plates arranged on the other side of the deflectable mass and the plates of the second retention bar become greater. In each case, a conductor track 4 is brought out from both retention bars 19 to a shared edge of the acceleration sensor.

The printed conductors 4 are patterned out of the third layer 3 and electrically insulated via the second layer 2 from the first layer 1. The conductor tracks 4 are electrically isolated via recesses from other regions of the third layer 3. In the same way, a conductor track 4 is brought out from the deflectable mass 7 to one edge of the acceleration sensor that is patterned out of the third layer 3 and is electrically insulated by means of the second layer 2 from the first layer 1, and likewise electrically isolated by means of recesses 10 from other regions of the third layer 3. Due to the formation of the recesses 10 and because the second layer 2 is used as an insulating layer, it is possible to form conductor tracks 4 in the third layer 3 which are used for contacting the acceleration sensor.

A further improvement in the conductivity of the conductor tracks 4 is achieved in that a conductive layer 24 is deposited on to the conductor tracks 4. A metal such as aluminum, for example, is used as a conductive layer. Due to the fact that when the deflectable mass 7 is deflected, the distances decrease from the plates of the deflectable mass 7 to the plates of a retention bar, and increase to the plates of the other retention bar, two measuring signals are obtained. The two measuring signals are evaluated, and because of the change in the capacitances between the plates of the deflectable mass 7 and the plates of the retention bar 19, the deflection of the deflectable mass 7 and, thus, the acting force is calculated. The conductor tracks 4 are run to connection points 20. The measuring signals of the acceleration sensor are tapped off at the connection points 20.

German Patent No. 44 19 844 describes an acceleration sensor, where each movable plate is arranged between two fixed plates. Sensors of this type are only able to be realized when conductor-track crossovers are possible. Conductor-track crossovers of this type are associated with considerable outlay in manufacturing the sensors. When working with the sensor according to the present invention, no conductor-track crossovers whatsoever are needed, since only one fixed (stationary) plate is assigned to each movable plate that is suspended on the deflectable mass 7. The individual regions are isolated from one other exclusively by the etching of trenches into the upper layer 3. The insulation from the lower layer 1 is guaranteed by the dielectric intermediate layer 2. Sensors of this type are able to be manufactured quite easily.

Figure 2:
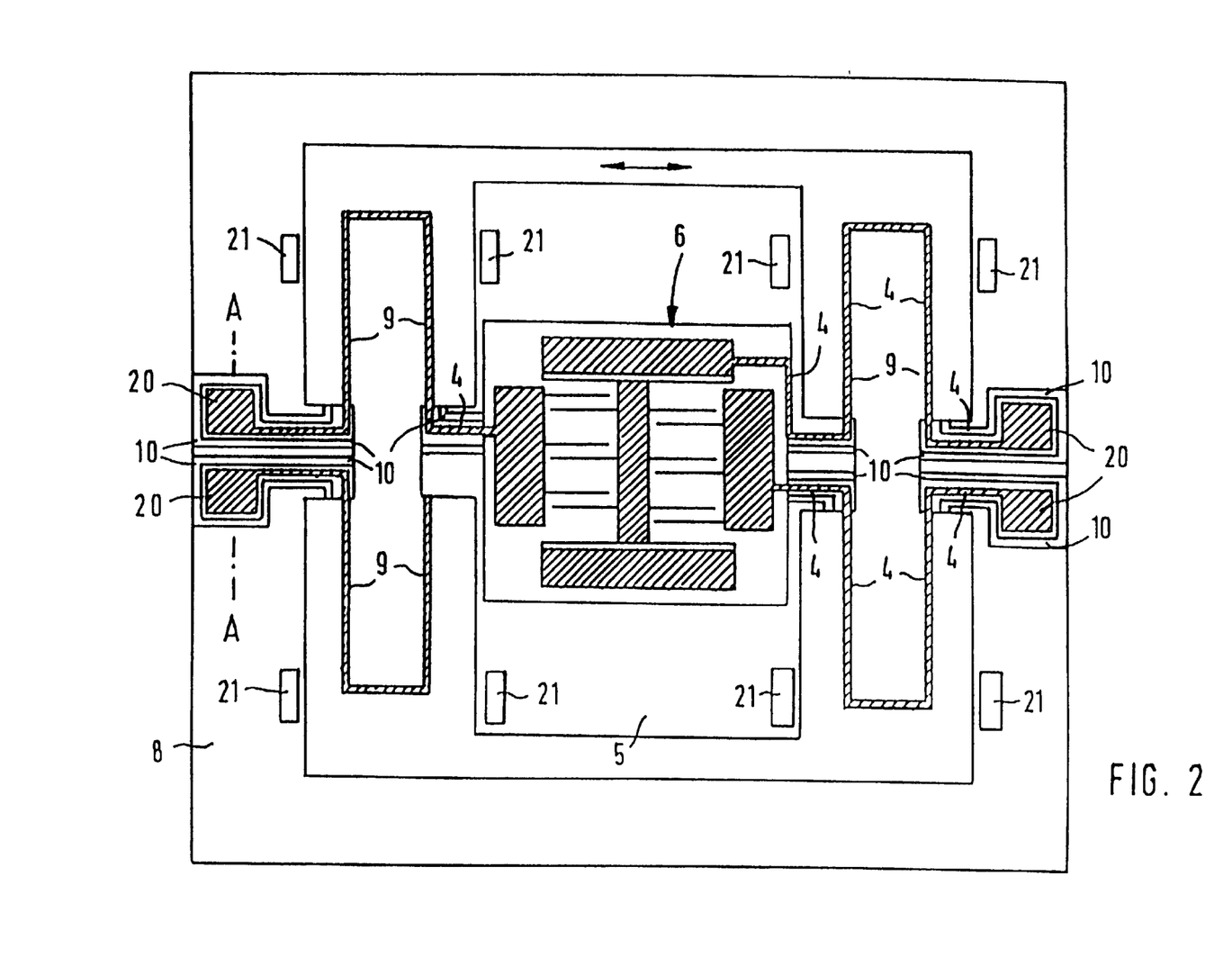
FIG. 2 illustrates an rpm sensor according to the present invention.

FIG. 2 depicts an rpm sensor with a frame 8, in which a vibrational mass 5 (resonator) is mounted via webs 9 so as to permit vibration. The vibrational mass 5 is excited into a linear vibration by means of driving mechanisms 21. Electrical, magnetic or piezoelectric drives are used, for example, as driving mechanisms. Suitable driving mechanisms are known, for example, from the European Patent No. 53 93 93. An acceleration sensor 6 corresponding to FIG. 1 is mounted on the vibrational mass 5. The acceleration sensor 6 is arranged in the detection direction normal to the vibrating direction of the vibrational mass 5. The conductor tracks 4, which emanate from the retention bars and the deflectable mass 7, lead via the webs 9 to the frame 8. Comparably to the acceleration sensor, the sensor is composed of a first, a second, and a third layer. The conductor tracks 4 are patterned out of the third layer 3. In the frame 8, the conductor tracks 4 are electrically isolated by recesses 10 from the third layer 3. In addition, the conductor tracks 4 are electrically insulated via the second layer 2 of the frame 8 from the first layer 1 of the frame 8. The representation of the acceleration sensor is only shown schematically here, since the layer construction was already explained in detail with respect to FIG. 1 of the acceleration sensor.

The webs 9 are patterned both out of the upper layer 3, as well as out of the lower layer 1. This is elucidated further in the subsequent FIGS. 3 and 4. The conductor tracks 4 arranged on the edge 8 pass over directly into the webs 9, so that an electrical contacting of the acceleration sensor arranged on the vibrational mass 5 is achieved via the webs 9. Isolation trenches 10 are likewise provided in the upper layer 3 on the vibrational mass 5 in the region that the webs 9 lead into, thus ensuring, here as well, an electrical isolation of the signals which are conducted via the webs 9 on or from the vibrational mass 5.

It is possible to develop an rpm sensor in this manner, without having to undertake a costly electrical contacting of the acceleration sensor. Because the conductor tracks 4 are brought out as electrically insulated tracks into the frame 8, there can be a simple, electrical contacting of the conductor tracks 4 in the frame 8. A further advantage lies in that, in a process with the acceleration sensor, the rpm sensor is patterned out of a three-layer system, preferably a silicon-on-insulator layer.

Figure 3:
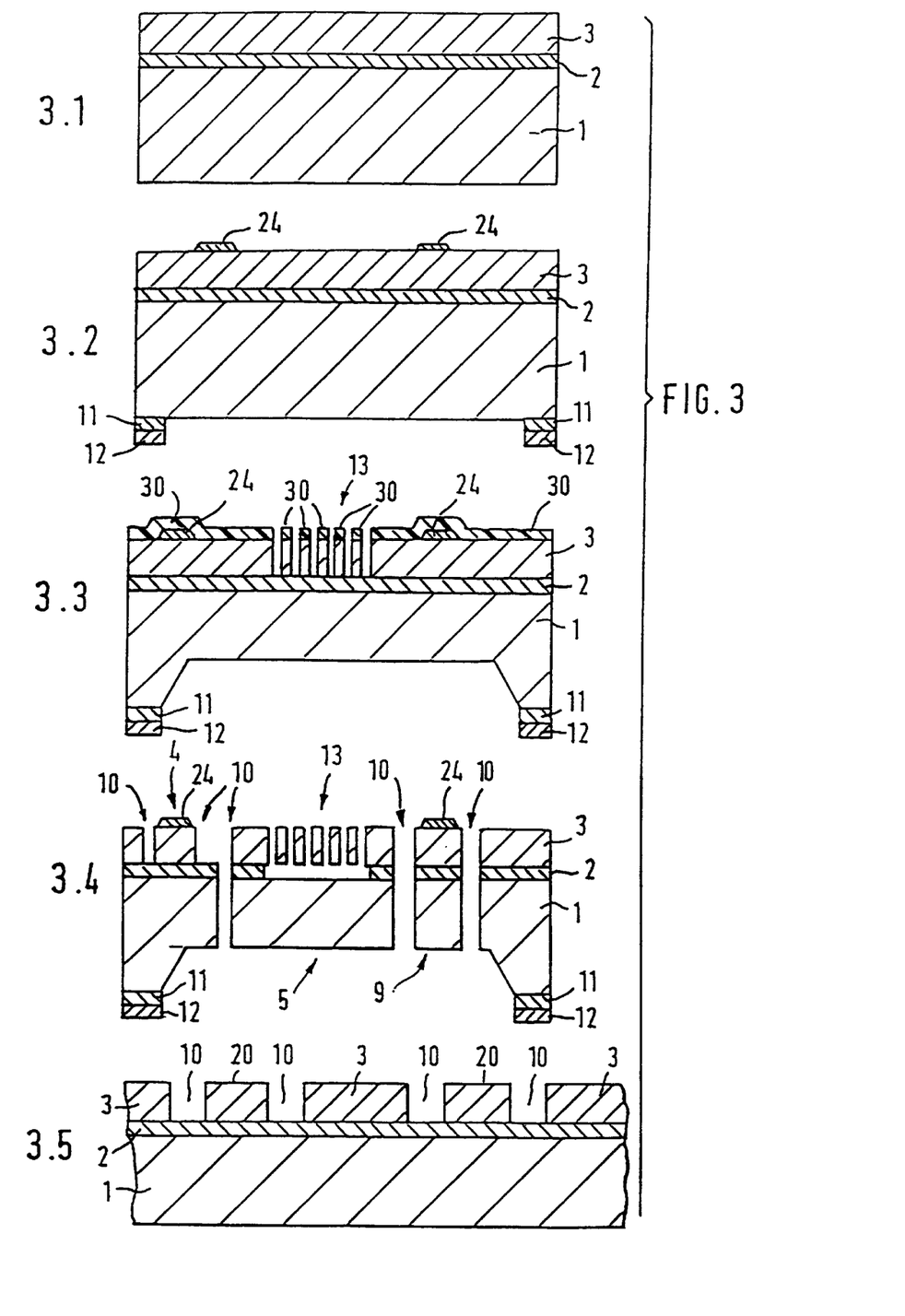

FIG. 3 illustrates steps of a process for manufacturing an acceleration sensor or an rpm sensor according to the present invention. FIG. 3.1 shows a three-layer system comprised of a first layer 1, onto which a second layer 2 is deposited. A third layer 3 is deposited on the second layer 2. The first layer 1 includes silicon, the second layer 2 includes silicon oxide and the third layer 3 again includes silicon. However, one can also use other three-layer systems, which can be selectively ablated, such as $SiO_2$, $Si_3N_4$, $Al_2O_3$, polyimide, teflon, and Si-carbide.

As a starting material, a silicon-on-insulator (SOI) wafer is used, for example, the third layer 3 including p++ or n++ doped silicon and having a thickness of about 15 $\mu$m. The second layer 2 is made of silicon oxide and has a thickness in the $\mu$m range. The first layer 1 is represented by a silicon wafer. It is equally possible to use epi-poly wafers, whose manufacturing and use for sensors is already described in, for example, German Patent No. 43 18 466. For the third layer 3, a heavily p- or n-doped silicon layer is used, which is deposited as a second layer 2 on to a silicon oxide layer a few $\mu$m thick. The epi-polysilicon layer is approximately 12 $\mu$m thick.

Applied to the SOI wafer or epi-poly wafer on the rear side, i.e., on the first layer 1, is a first coating layer 11 in the form of silicon oxide, and a second coating layer 12 in the form of plasma nitride. Aluminum is subsequently applied by vapor or sputter deposition on to the third layer 3 in the regions of the conductor tracks. The deposited aluminum is patterned with the aid of photolithographic steps and etching methods in the form of the track conductors 4 as a conductive layer 24.

Deposited subsequently on to the second coating layer 12 is a photo-resist, which is removed in a specified region, in which the vibrational mass 5 is constructed. After that, the second and first coating layer 12, 11 are etched away in the region of the vibrational mass. This is shown in FIG. 3.2.

Photo-resist 30 is then applied to the third layer 3 and patterned in accordance with a comb-type structure of an acceleration sensor. The comb-type structure of the acceleration sensor is subsequently etched into the third layer 3. An anisotropic silicon etching method is used, which is described in, for example, German Patent No. 42 41 045. In this manner, comb-type structures are produced which have a large aspect ratio. The first layer 1 is then etched off using KOH etching methods to a residual thickness of about 100 $\mu$m. This is depicted in FIG. 3.3.

After that, the second layer 2, which is made of, for example, silicon oxide and is used as sacrificial oxide underneath the comb-type structure 13 of the acceleration sensor, is etched. In this manner, a comb-type structure 13 is obtained, which is secured with excursion capability to the second layer 2. These comb-type structures represent the acceleration sensor according to FIG. 1. In FIG. 3, however, the actual structure of the acceleration sensor is only alluded to for the sake of clarity of the representation. For the further processing, the second layer 2 is removed from underneath the comb-type structures 13. Thus, movable structures are created, which are suitable for the acceleration sensor.

However, because of the large lateral dimensions, the second layer 2 is not removed from beneath other regions of the top layer 3. In another step, the photo-resist layer 30 is then removed, and a new photo-resist layer 30 is deposited and patterned. The pattern in this new photo-resist layer is then used to etch in trenches, which extend through the upper layer 3, the second layer 2, and the first layer 1. These etched in trenches can thus be used to etch out webs 9 and a vibrational mass 5 out of the multilayer substrate. This is depicted in FIG. 3.4

The dimensions of the vibrational mass 5 are defined by the introduced trenches 10. The comb-type structures 13 of the acceleration sensor are deposited on the vibrational mass 5. Furthermore, a web 9 is shown, whose geometric dimensions are likewise defined by the trenches 10. The etching of the trenches 10 takes place in a multi-step process. First, for example, the upper layer 3 is patterned in a fluorine plasma. The second layer 2 is patterned in another etching step, for example in a chlorine-containing plasma. In a further etching step, for example, again in a fluorine plasma, the patterning of the first layer 1 takes place. The photo-resist layer, which is used as an etching mask for this process, is subsequently removed again.

FIG. 3.4 depicts a simplified representation which does not show a cross-section through a real rpm sensor. However, since all elements of an rpm sensor are shown in accordance with FIG. 2, such as webs 9, a vibrational element 5, comb-type structures for an acceleration sensor 13, it is obvious that rpm sensors in accordance with FIG. 2 are able to be produced with the described sequence of process steps. In the edge area, conductor tracks 4 are shown, which are only patterned out of the upper silicon layer 3. These can be produced, for example, in the same process step as the comb-type structures 13. It must be ensured then, however, by the large lateral dimensions of the conductor tracks 4 that there is no undercut-type etching of the second layer 2 situated beneath the conductor tracks 4.

Alternatively, it is also possible, after the comb-type structures 13 are produced, to deposit and to pattern another photo-resist layer, which is then used exclusively for producing the track-conductor structures 4. However, this increases the outlay for manufacturing the sensors. The purpose of the etching of the back of the layer 1, as described with respect to FIG. 3.3, is to achieve a thinning of the bottom silicon layer 1 in the area of the resonator 5 or of the webs 9. This measure reduces the etching time required to completely etch the trenches 10 through the layer 1.

FIG. 3.5 shows a cross-section A—A through the frame 8 in the area of the connection points 20. The electrical isolation of the connection points 20 via the recesses 10 from the third layer 3 of the frame 8 is clearly revealed.

One variant for manufacturing an acceleration sensor according to the present invention is elucidated on the basis of FIG. 3.6. All steps for patterning the layer 1 are eliminated here. Starting out from the structure in accordance with FIG. 3.2, as already described with respect to FIG. 3.3, a photo-resist layer 30 is deposited on the surface and patterned through a photomask. An etching step then follows, for example, in which trenches 10 are introduced using a fluorine-plasma etching process into the top silicon layer 3. These trenches extend to the second layer 2.

In a subsequent etching step, the second layer 2, including silicon oxide, is etched. This can take place, for example, in an aqueous hydrofluoric acid solution or in a hydrofluoric-acid-containing gas. This etching step completely removes the second layer from beneath the finely etched trench patterns for the comb-type structures 13. However, the patterns for the conductor tracks 4, which have a comparatively large lateral extent, remain securely mechanically joined to the first layer 1 through the layer 2. Since the photomask 30 can remain on the surface when this etching step is performed, the metallization patterns 24 are also protected, for example, from the attack of the etching medium, so that they may also be made of aluminum. This process for manufacturing acceleration sensors is distinguished, above all, by the few process steps used. Thus, very cost-effective acceleration sensors can be produced.

Figure 4:
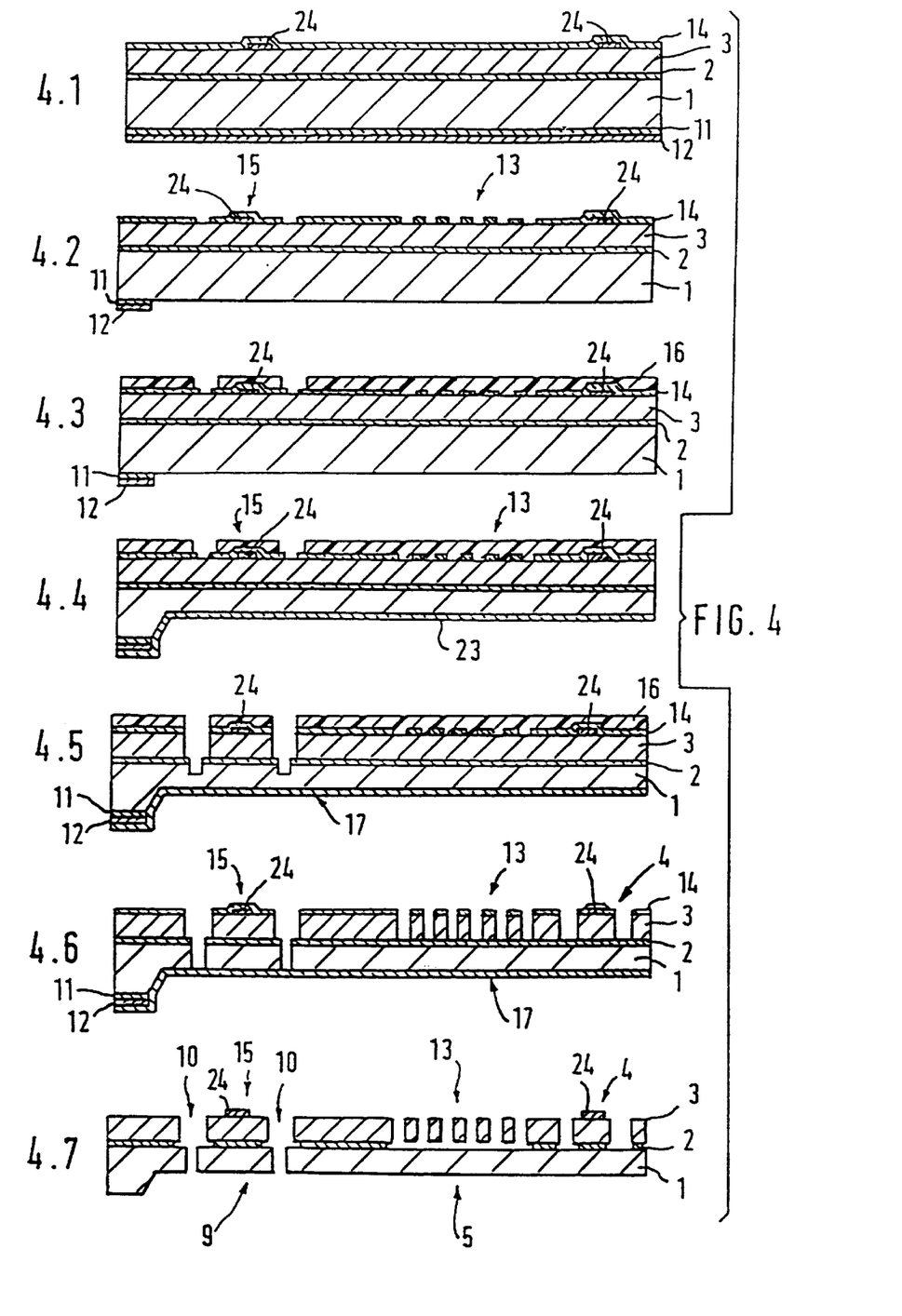

FIG. 4 depicts another process for manufacturing an acceleration sensor or an rpm sensor according to the present invention. Here, a three-layer system is used, which includes a first layer 1, a second layer 2, and a third layer 3. The first layer 1 includes silicon, the second layer 2 includes silicon oxide, and the third layer 3 includes heavily p- or n-doped silicon. The described three-layer system represents a silicon-on-insulator structure. Metal conductor tracks 24 are deposited on the third layer 3, preferably in the regions of the conductor tracks 4. This is achieved by sputter or vapor deposition and subsequent patterning.

A third coating layer 14 of silicon oxide is subsequently deposited on the metal conductor tracks 24 and the third layer 3. A first coating layer 11 and a second coating layer 12 are deposited on the first layer 1. The first coating layer 11 includes silicon oxide, and the second coating layer 12 includes plasma nitride. The third coating layer 14 is subsequently patterned in conformance with the comb-type structure 13 of the acceleration sensor, and with the form of the track conductors 4 and of the webs 9. A fourth coating layer 16 in the form of a photo-resist is deposited on the patterned, third coating layer 14. The fourth coating layer 16 is removed in the form of the webs 9. This is shown in FIG. 4.3.

The first layer 1 is then etched down within the frame 8 to a specified thickness of 100 μm and covered with a passivation layer 17. This is shown in FIG. 4.4. Trenches are subsequently introduced in an etching process. Since the patterned fourth coating layer 16 is used as an etching mask for these trenches, initially only the geometric form of the webs 9 is etched in. These trenches are etched in for so long until the layers 3 and 2 are completely penetrated, and a portion of the layer 1 is likewise etched through. The etching is=driven for so long into the layer 1, until the residual thickness corresponds more or less to the thickness of the layer 3. This is shown in FIG. 4.5. The fourth coating layer 16 is subsequently removed, and the etching process is continued. This time, the patterned, third coating layer 14 acts as an etching mask, which contains the patterns for the webs 9, comb-type structures 13, and conductor tracks 4.

In so doing, an etching process is used where only the silicon materials of the layers 3 and 1 are etched, however, not the layer 2 or 17. The etching is then continued for so long until the trenches for the webs 9, the passivation layer 17, and the trenches for the comb-type structures 13 or the conductor tracks 4 reach the second layer 2. The second layer 2 is subsequently etched away from underneath the comb-type structure 13. The webs 9 are simultaneously etched out of the second layer 2. However, the webs 9 are developed to be wide enough to be securely joined by way of a second layer 2 to the first layer 1. The passivation layer 23 is subsequently etched away.

In this manner, one obtains an rpm sensor in accordance with FIG. 2. This is shown schematically in FIG. 4.7. If the intention is to manufacture an acceleration sensor in accordance with the described process, then the steps of patterning out the webs 9 and the entire processing of the first layer 1 are eliminated. Otherwise, one proceeds in accordance with the processes described with respect to FIG. 4.

Figure 5:
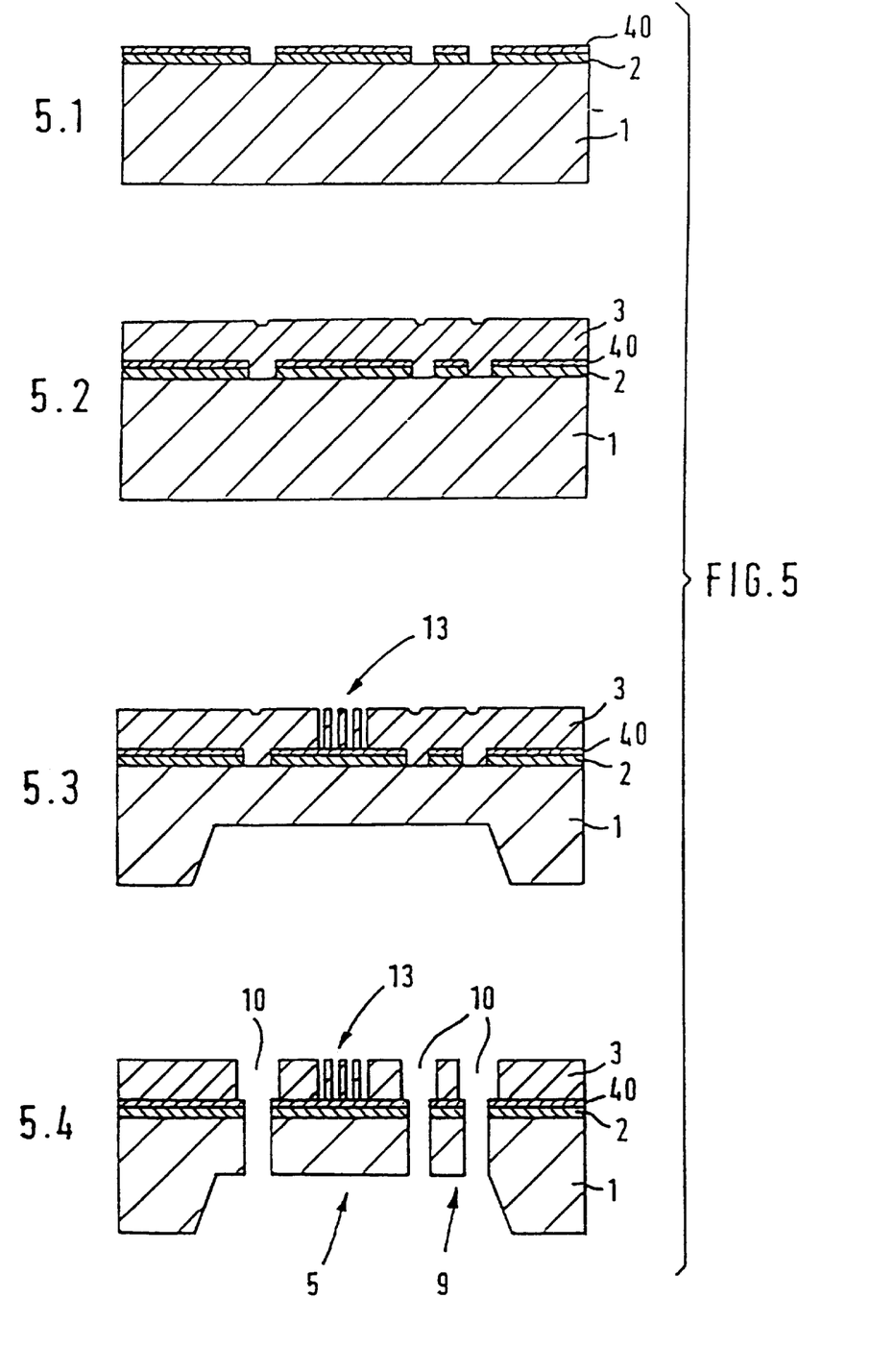

FIG. 5 describes another process for manufacturing an rpm sensor according to the present invention. This process proceeds from a silicon substrate 1, on which an etchable layer 2, such as silicon oxide, is deposited. Optionally, a polysilicon starting layer 40 can stile be deposited on the layer 2. This second layer 2 and, if indicated, the polysilicon starting layer 40 deposited thereon are then patterned. Another silicon layer 3 is then produced through deposition. This other silicon layer 3 can be deposited in an epitaxy reactor, as described in, for example, German Patent No. 43 18 466. In those regions in which the layer 3 comes to rest directly on the silicon substrate 1, the silicon layer 3 grows as a monocrystalline silicon layer. In the other regions, the polysilicon starting layer 40 acts as a starting layer for growing a polycrystalline silicon layer. The thus created layer construction is shown in FIG. 5.2.

Through the application of etch maskings and etch steps, trench patterns are then etched into the upper silicon layer 3 and into the polysilicon starting layer, which extend up to the second layer 2. They then again form comb-type structures 13 for an acceleration sensor. In addition, starting from the rear side, a recess is etched in to reduce the thickness of the first silicon layer 1. The thus formed pattern is illustrated in FIG. 5.3. It is then depicted in FIG. 5.4 how trench patterns 10 are introduced, which extend through the upper layer 3, the polysilicon layer 40, the second layer 2, and the first layer 1. In this manner, a resonator 5 and a web 9 are formed.

In the etching process used here, essentially only silicon is etched. Thus, the upper layer 3 and the lower layer 1 are etched. Since the masking for these trench patterns 10 is selected so as to allow the patterns to lie over the already produced patterns of the second layer 2, the entire substrate can be etched through with an etching process of this type. In so doing, however, only the dimensions of the upper layer 3 are controlled by the etching mask. The geometric dimensions in the lower layer 1 are determined by the patterns already introduced into the layer 2. The reason for this is that the patterned layer 2 serves as an etching mask for etching the layer 1 below. One can also utilize this to compensate for adjustment errors-of the etching mask relatively to the patterns in the layer 2. To this end, the geometric dimensions of the etching mask are selected to be somewhat larger for the trenches 10 than the patterns in the layer 2.

What is important in this process is that the accuracy of the patterning of the first layer 1 is essentially dependent upon the accuracy of the patterning of the layer 2, as is shown in FIG. 5.1. The layer 2 illustrated in FIG. 5.1 can be patterned with especially high precision, so that, as far as the first layer 1 is concerned, the geometric dimensions of the vibrational element 5 of the web 9 are very precise. Since the thickness of the upper layer 3 is on the order of 10 μm and of the lower layer 1 on the order of 50 μm, the essential geometric dimensions of the resonator 5 and of the webs 9 are thus produced with particularly great precision. Furthermore, it is advantageous that by pre-patterning the layer 2, the trenches 10 can be etched in one single process step. The fabrication of the patterns is also simplified by this means.

The etching processes explained in the description for FIGS. 5.3 and 5.4 take place either by using a plurality of photo-resist masks, as had already been explained with regard to FIG. 3, or by using a plurality of maskings arranged one over the other, as had already been described with respect to FIG. 4.

It was explained with regard to FIG. 5.1 that the likewise deposited polysilicon starting layer 40 is patterned as well.

In this case, the upper silicon layer 3 has monocrystalline silicon regions. Alternatively, it is also possible to first deposit the polysilicon starting layer 40 after the second layer 2 has already been patterned. Here, the upper silicon layer 3 grows entirely as polycrystalline silicon.

Starting out from the processing state shown in FIG. 5.4, there is still an etching of the second layer 2 then in order to undercut the comb-type structures 13 by etching.

Figure 6:
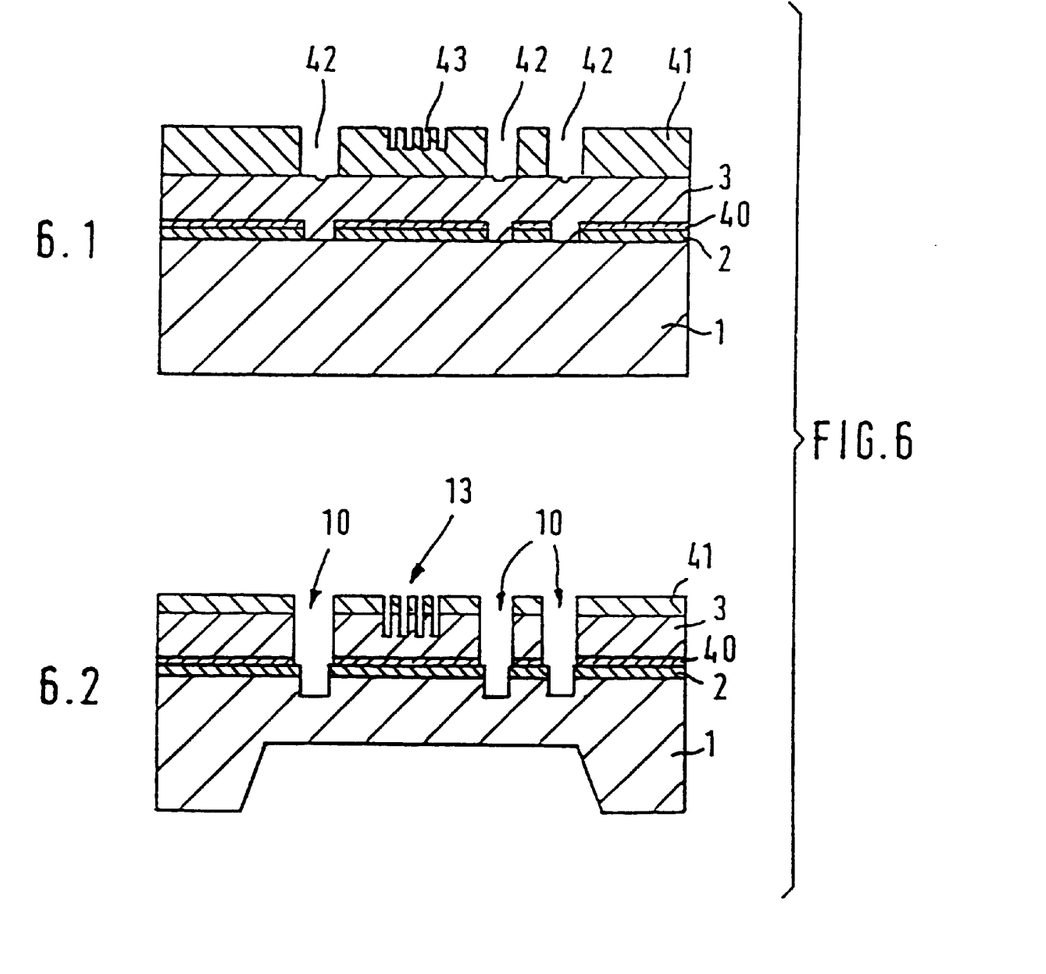

Another process for manufacturing an rpm sensor according to the present invention is shown in FIG. 6. It starts out from a substrate as shown in FIG. 5.2. An etching mask 41, which can include, for example, silicon oxide, is then applied. However, other etching masks are also conceivable, such as of photo-resist. The etching mask 41 has patterns 42, which reach all the way to the silicon layer 3. In addition, trenches 43 are provided, which do not reach all the way to the layer 3. The patterns 42 are provided at those sites where a complete etching right through the substrate to the rear side is supposed to take place. The patterns 43 are provided where there the intention is to only etch the upper silicon layer 3.

By etching the substrate in accordance with FIG. 6.1, the rpm sensor is then produced as shown in FIG. 5.4. FIG. 6.2 represents an intermediate step of this etching process. An etching process is used which also causes an ablation of the masking layer 41. Alternatively, it is also possible to use intermediate etching steps which entail an ablation of the masking layer 41. Because certain regions of the silicon surface are exposed right from the start, these regions are etched more quickly that those regions which are first exposed during the course of the etching process. This is shown in FIG. 6.2.

The trenches 10, which correspond to the patterns 42 of the etch masking, are already driven in this intermediate etching step entirely through the upper silicon layer 3 and a bit into the first silicon layer 1. However, the comb-type structures 13, which correspond to the patterns 43 in the etch masking 41, are only driven very little into the upper silicon layer 3. When the etching process is continued, the pattern is then formed as shown in FIG. 5.4.

The etching mask layer 41 can be fabricated, for example, by means of a two-step process for producing an etch masking layer of silicon oxide. To this end, a silicon layer is first deposited over the entire surface. Through a processing with a first photo-resist mask, the patterns 43 are then etched in. After that, the second photo-resist mask is applied, and the patterns 42 are etched in. After the photo-resist masks are removed, the two-step etching layer shown in FIG. 6.1 is then available.

This process has the advantage of not requiring any further photo-resist processes on the top surface after the etching mask 41 is produced. Since such photo-resist processes are always associated with a certain danger to already introduced patterns, the reliability of the process is thus improved.

What is claimed is:

1. An rpm sensor, comprising:
   a first layer formed of one of a conductive material and a semiconductive material;
   a second layer formed of an insulating material and deposited on the first layer;
   a third layer formed of one of the conductive material and the semiconductive material and deposited on the second layer;
   a frame being formed from at least one of the first layer, the second layer, and the third layer;
   a plurality of webs formed from at least one of the first layer, the second layer, and the third layer
   a vibrational mass formed from at least one of the first layer, the second layer, and the third layer and being mounted on the frame via the plurality of webs so that the vibrational mass is deflected in a first direction in response to vibrations; and
   a deflectable mass being formed from the third layer on the vibrational mass and being deflected in a direction perpendicular to the first direction in response to one of an interfering force and an interfering acceleration.

2. The rpm sensor according to claim 1, further comprising:
   a plurality of printed circuit traces formed from the third layer and being routed from the deflectable mass via the plurality of webs to a corresponding plurality of connection points provided on the frame, each of the plurality of printed circuit traces being electrically insulated from the first layer by the second layer, and each of the plurality of printed circuit traces being electrically insulated from the third layer by a corresponding plurality of openings provided in the third layer.

3. The rpm sensor according to claim 2, further comprising:
   an aluminum layer deposited onto each one of the plurality of printed circuit traces.

\* \* \* \* \*